US005516130A

United States Patent [19]
Mitchell

[11] Patent Number: 5,516,130
[45] Date of Patent: May 14, 1996

[54] FORGED CONTROL ARM

[75] Inventor: James Mitchell, Mequon, Wis.

[73] Assignee: Interstate Forging Industries Inc., Milwaukee, Wis.

[21] Appl. No.: 361,408

[22] Filed: Dec. 22, 1994

[51] Int. Cl.⁶ ........................................ B60G 3/00
[52] U.S. Cl. .......................... 280/96.1; 280/688
[58] Field of Search ................... 280/95.1, 96.1, 280/93, 688

[56] References Cited

U.S. PATENT DOCUMENTS 2,295,913  9/1942  Phelps ........................ 280/96.1

Primary Examiner—Kenneth R. Rice
Attorney, Agent, or Firm—Quarles & Brady

[57] ABSTRACT

A forged control arm for light trucks which is more durable than those currently available and which obviates the collection of debris. In a preferred manner, the forged control arm is formed with two leg portions joined by a common midsection and a support arm interconnecting the leg portions. A novel process for producing the control arm is also presented.

9 Claims, 4 Drawing Sheets

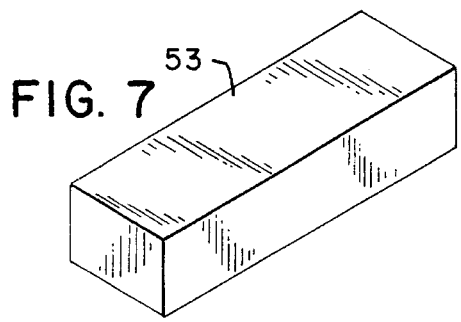
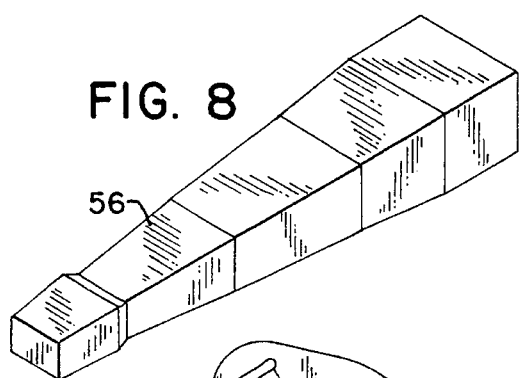
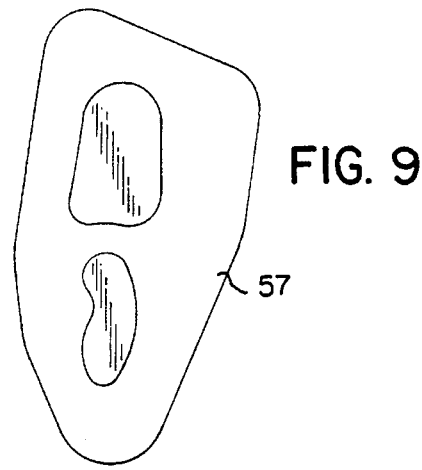
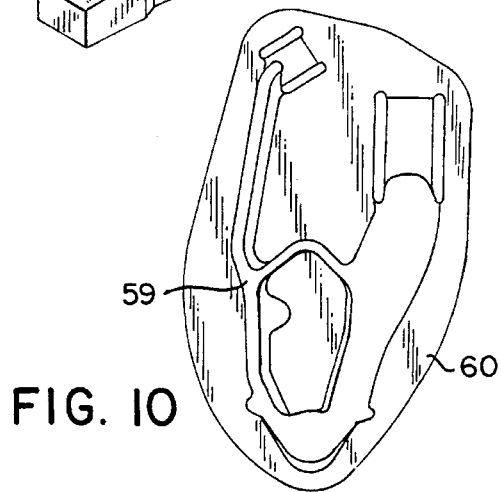
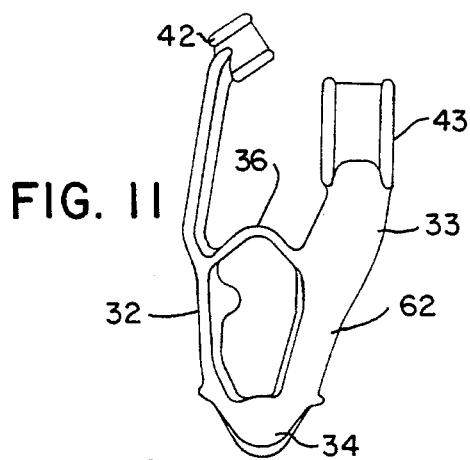
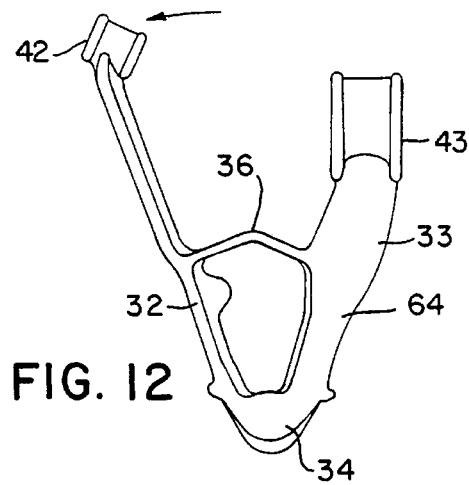
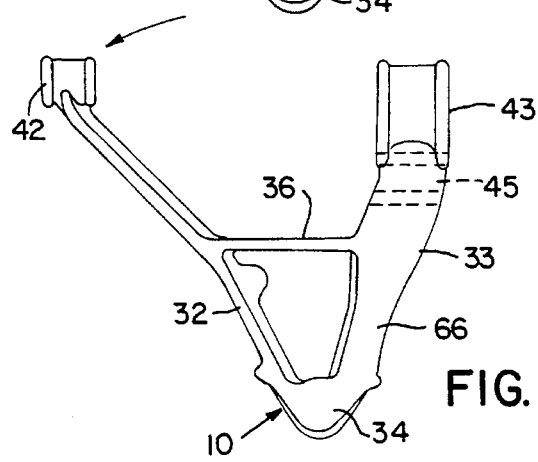

FORGED CONTROL ARM

BACKGROUND OF THE INVENTION

This invention relates to a control arm for a vehicle. More particularly, it relates to a forged lower control arm for light trucks such as pickup trucks, as well as a process for producing the control arm.

It is known in the prior art to provide lower control arms for light trucks. These assist in controlling the steering of the vehicle. They are produced by the fabrication of sheet metal stampings. Such sheet metal stamped control arms have limited capabilities. As examples, they are not rugged so as to withstand demanding applications such as heavy duty off-the-road use as one encounter with a pickup truck. Also, their design in utilizing a closed sheet of metal tends to collect unwanted debris such as mud and stones. This can cause problems in operating the vehicle.

Thus, there is a need for a control arm which is more durable than those previously produced, as well as one which will not accumulate debris.

SUMMARY OF THE INVENTION

The invention provides a forged control arm for a light truck which includes a body member having a first arm member and a second arm member joined by a midsection. The arm members have mounting passages at the ends thereof, and the midsection also has connector means. A support arm extends between the first and second arm members and provides a spacing between the arm member.

In a preferred manner, there is an additional passage extending through one of the arm members adapted to receive a torsion bar with the additional passage positioned adjacent one of the mounting passages in one of the arm members.

In one aspect, one of the arm members has a larger width than the other arm member.

In another preferred manner, the support arm is positioned closer to the midsection than ends of the arms opposite the midsection.

In still another preferred manner, the forged control arm is of an essentially "A" shape.

The invention also provides a process for producing a forged control arm for a light truck. A metal billet is provided having a first desired shape. The billet is preformed into a second desired shape, and the second desired shape is forged into a forged rough shape. The forged rough shape is forged further into a body member having a first arm member and a second arm member joined by a midsection with the arm members providing passages at the ends thereof and the midsection, as well as a support arm extending between the first and second arm members. Flash is trimmed from the body member, and the body member is unfolded so that the support arm extends in an essentially straight line between the arm members.

In a preferred manner of effecting the process, an additional passage is pierced through one of the arms adjacent one of the passages and is adapted to receive a torsion bar.

In another preferred manner, the unfolding step is performed in several continuous stages along two bending axes of one of the arms.

In yet another preferred manner, the unfolding is further effected along two bending points adjacent the connection of the support arm and the two arms.

It is an object of the invention to provide an improved control arm for light trucks.

It is another object of the invention to provide a forged control arm for light trucks.

It is yet another object of the invention to provide a forged control arm for light trucks which offers increased durability over those commonly available.

It is still another object of the invention to provide a forged control arm for light trucks which obviates the collection of debris.

It is yet another object of the invention to provide a novel process for producing a forged control arm for light trucks.

These and other objects and advantages of the invention will be apparent from the following detailed description and drawings.

DESCRIPTION OF THE DRAWINGS

FIGS. 7–13 are perspective and side elevation views illustrating the forging of the control arm of this invention beginning with a heated steel billet.

DESCRIPTION OF THE PREFERRED EMBODIMENT

Figure 1:
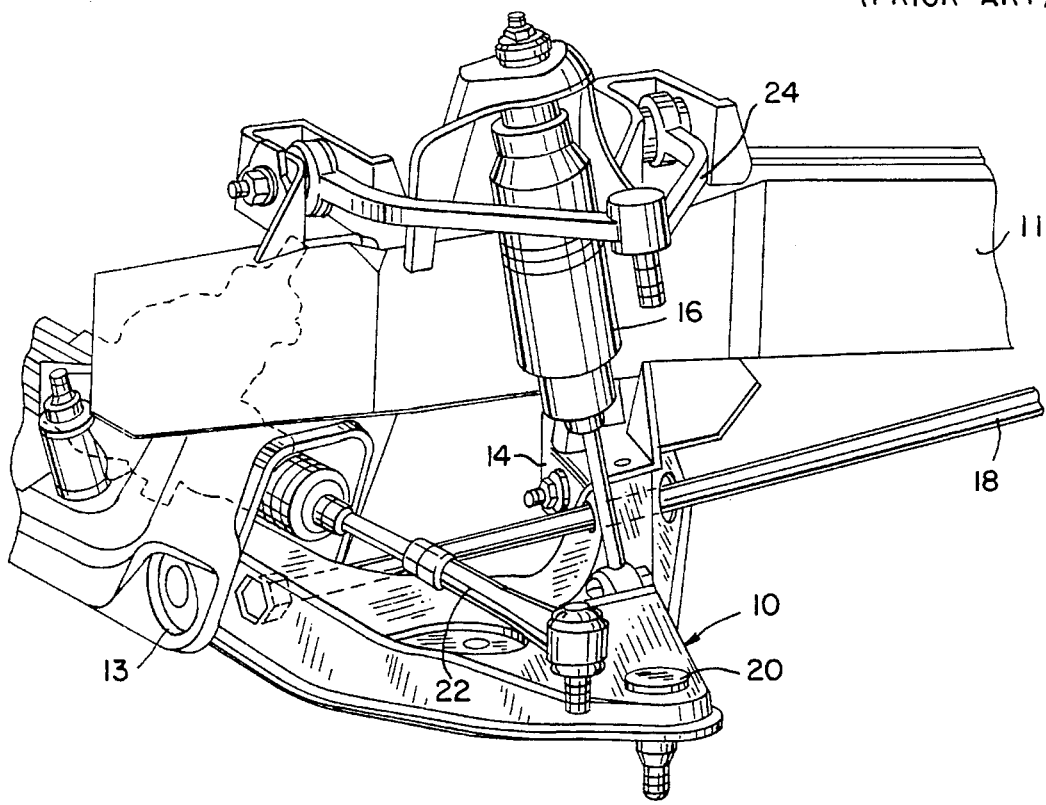
FIG. 1 is a perspective view illustrating a prior art lower control arm as it would be connected to a vehicle.

Preceding to a detailed description, a prior art control arm, generally 10, is shown in FIG. 1 and is connected to a frame 11 in the usual manner such as by the connections 13 and 14. The usual shock absorber 16 is connected to the control arm, as well as a torsion bar 18. A ball stud 20 interconnects the control arm to the usual steering knuckle (not shown) which is steered by the steering arm 22. There is also the standard upper control arm 24.

Figure 2:
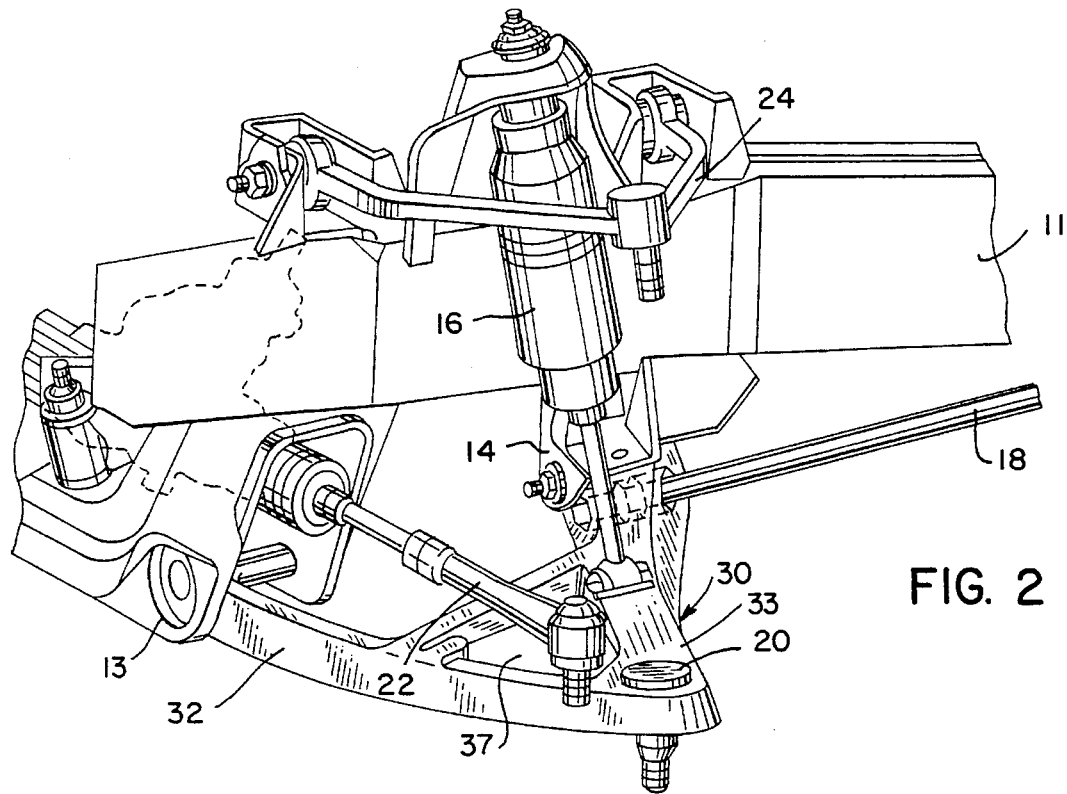
FIG. 2 is a view similar to FIG. 1 showing the control arm of this invention.

FIG. 2 represents the forged control arm of this invention shown by the numeral generally 30. It is connected to the frame 11 and utilized with the same components in the manner previously described in conjunction with the prior art control arm 10. One difference is the manner in which the torsion bar is connected, which will be later explained.

Figure 3:
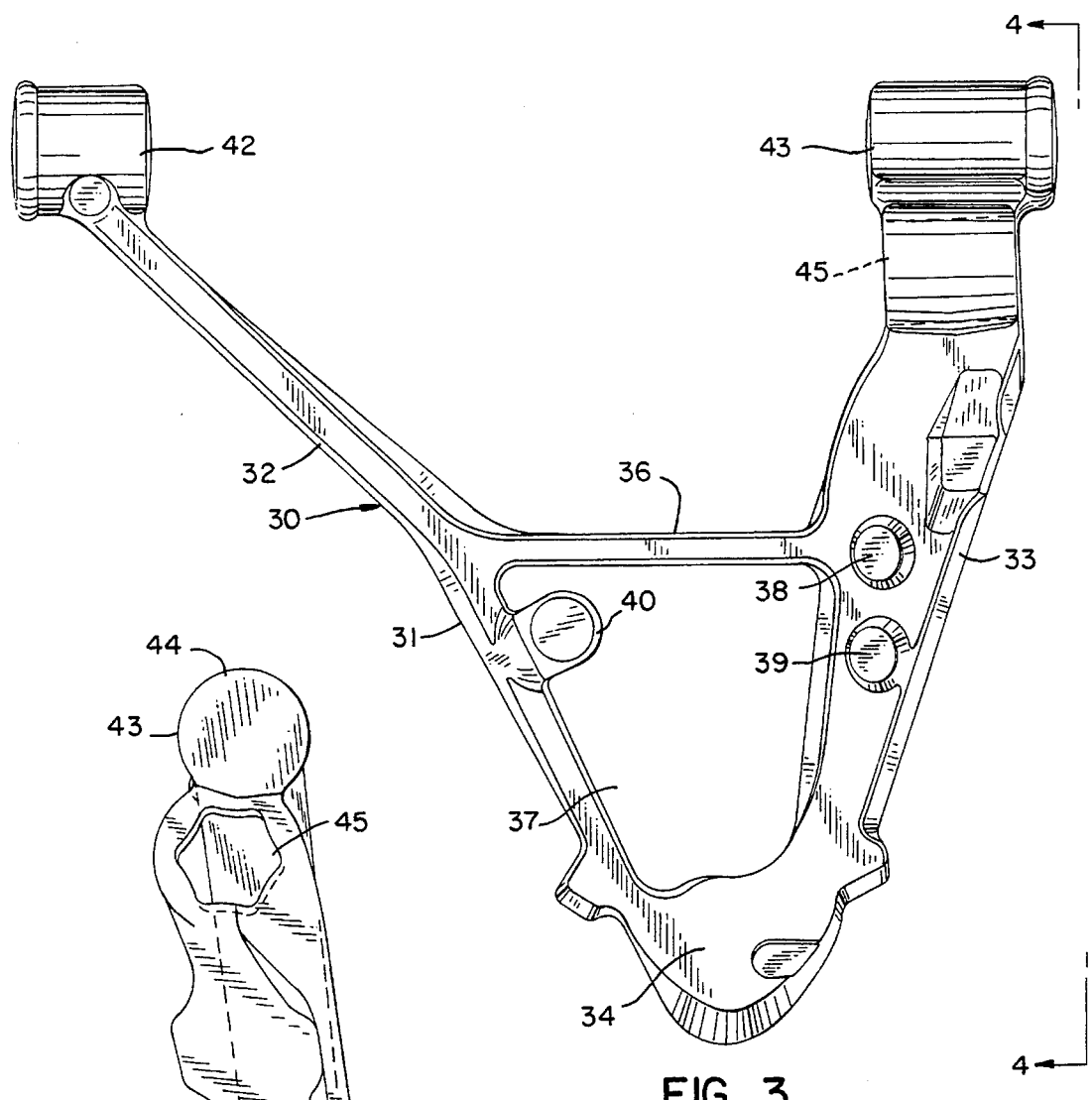
FIG. 3 is a side elevational view of the control arm of this invention.
Figure 4:
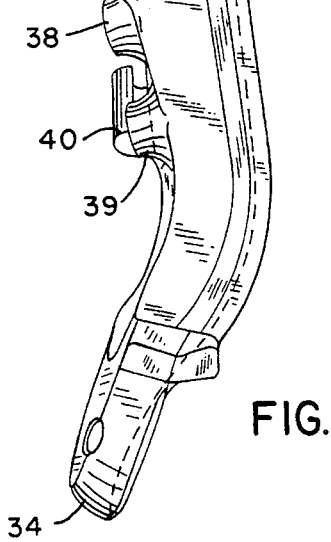
FIG. 4 is a view taken along line 4—4 of FIG. 3.

Referring to FIGS. 3 and 4, it is seen that the forged control arm 30 includes a forged body member 31 with the arms 32 and 33 joined by a midsection 34. A cross arm 36 extends in a straight line between the two arms, and thus effects a space 37 in the forged body member 31. There are two bosses 38 and 39 extending from arm 33 for the purpose of connecting with the shock absorber 16. Boss 40 extends from arm 32 for connection with a stabilizer bar (not shown). At the ends of the arms 32 and 33 are the usual mounting bosses or passages 42 and 43 for connection with the frame 11, as previously described.

Figure 5:
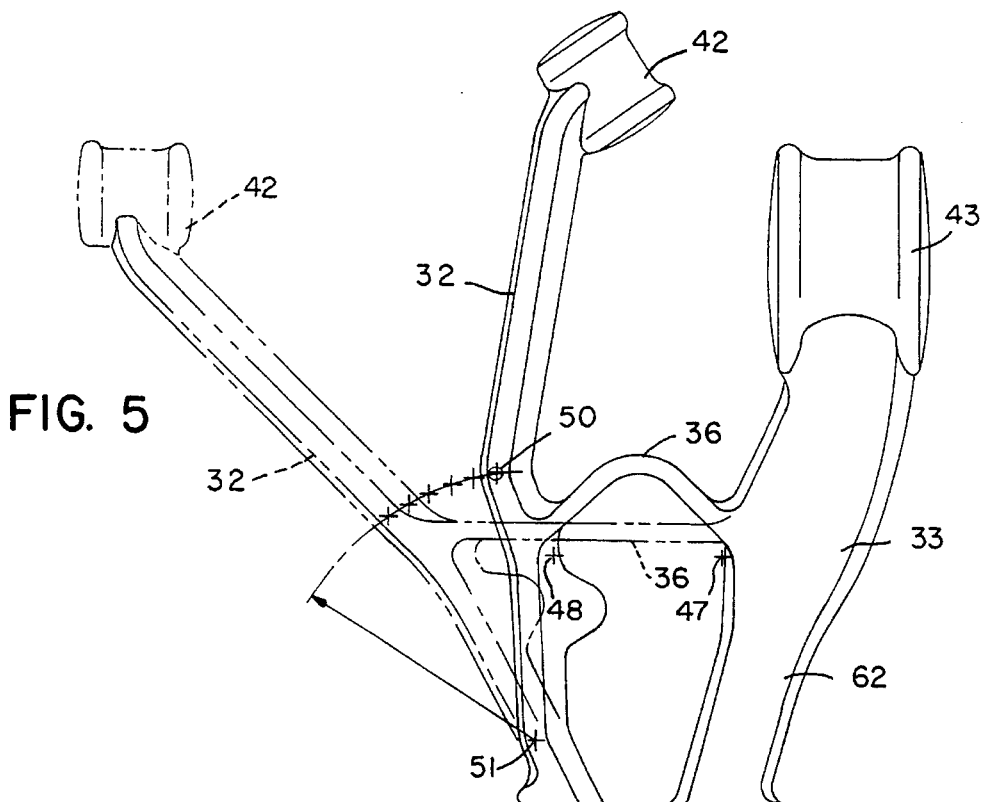
FIG. 5 is a view similar to FIG. 3 showing the control arm of this invention in one stage of production.
Figure 6:
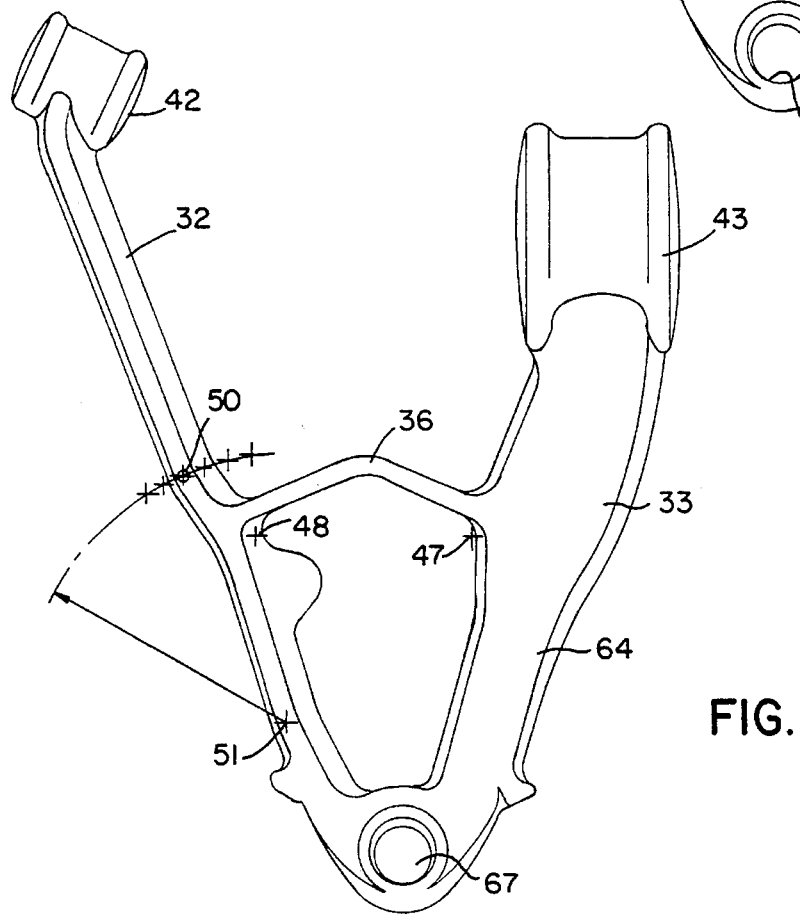
FIG. 6 is a view similar to FIG. 5 showing the control arm in a later stage of production.

FIGS. 5 and 6 represent an "unfolding" of a forged control arm 62 immediately after the flashing has been removed from the forging and corresponds to the stage as shown in FIG. 11 whereas control arm 64 represents the control arm in a later stage of unfolding and corresponds to FIG. 12. These are later described in conjunction with the process for producing the forged control arm 30. As seen in these figures, a bending action is effected on the arm 32 which is of a lesser width than arm 33. There are several bending points and axes involved with this unfolding process which is effected in a multistep procedure and preferably in five degree bending increments. FIGS. 5 and 6 show midsection bending points, whereas numeral 50 illustrates a minor bending axis and numeral 51 a major bending axis. The unfolding is continued until the mounting bosses 42 and 43 are in substantial alignment, such as shown in FIG. 3, and the cross arm or support arm 36 extends in an essentially straight line between the arms 32 and 33.

FIGS. 7–13 illustrate the forging of the control arm of this invention. The first step is depicted in FIG. 7 where a billet 53 is heated to forging conditions. The next step in the process is shown in FIG. 8 where a preform 56 is forged. Next, and as shown in FIG. 9, a rough shape 57 is produced and after further forging, a forged detail results such as shown at 59 with flashing 60. Upon the removal of the flashing 60, the control arm is in an early stage of development as shown in FIG. 11 by the numeral 62. This corresponds with the unit previously described in conjunction with FIG. 5. FIG. 12 shows the forging 64 as described earlier in conjunction with FIG. 6 and in subsequent state of unfolding. Accordingly, FIGS. 5, 6, 11 and 12 represent the important unfolding steps of the forging.

The resultant forging is shown in FIG. 13 where the hexagonal passage 45 is illustrated. The purpose of this hexagonal passage is to connect the torsion bar 18. This hexagonal passage 45 is hot pierced into arm 33 during the unfolding operation shown in FIGS. 11 and 12. The location of hexagonal passage 45 in arm 33 allows for the use of a shorter torsion bar 18 while obviating the need to provide an extra passage in the control arm. This is seen in comparing FIGS. 1 and 2. A final step is a machining one where, among other things, the ball stud is applied such as through the opening 67 shown in the midsection in FIGS. 5 and 6.

An important feature of this invention is that the forged control arm 30 is of a very durable construction by the fact that it is a forging. This means that it can stand up to the most rugged and demanding applications such as in conjunction with heavy-duty off-road pickup trucks. Further, the fact that the forging provides an open space between the arms, such as shown at space 37 in FIG. 3, avoids the accumulation of debris such as mud and stones during the operation of the vehicle. This can best be visualized in conjunction with FIG. 2.

The forged control arm as described herein is particularly employed in conjunction with light trucks such as heavy-duty off-road pickup trucks which fall in classification 1 and 2 of commercial vehicles. These are vehicles having a weight of 6,000 to 10,000 pounds.

Steel is the preferred metal used in forging the billet 53 into the forged control arm 30. While the arms 32 and 33 are shown of a particular width and geometric configuration, it is obvious that it can take various other forms.

The foregoing invention can now be practiced by those skilled in the art. Such skilled persons will know that the invention is not necessarily restricted to the particular embodiments presented herein. The scope of the invention is to be defined by terms of the following claims, as given meaning by the preceding description.

I claim:

1. A forged one-piece control arm for light trucks comprising:

a body member defining a first arm member and a second arm member joined by a midsection, said arm members having mounting passages at the ends thereof and said midsection having connector means; and a support arm extending between said first and second arm members and providing a spacing between the arm members on each side of the support arm.

2. The forged control arm as defined in claim 1 further including an additional passage extending through one of the arm members adapted to receive a torsion bar.

3. The forged control arm as defined in claim 1 wherein said forged control arm is of an essentially "A" shape.

4. A process for producing a forged control arm for a light truck comprising:

providing a metal billet into a first desired shape;

preforming said billet into a second desired shape;

forging said second desired shape into a forged rough shape;

forging said forged rough shape into a body member defining a first arm member and a second arm member joined by a midsection with said arm members providing passages at the ends thereof and said midsection as well as a support arm extending between said first and second arm members;

trimming flash from said body member; and unfolding said body member so that said support arm extends in an essentially straight line between said arm members.

5. The process of claim 4 wherein an additional passage is pierced through one of said arms adjacent one of said passages.

6. The process of claim 4 wherein said unfolding step is performed in several continuous stages.

7. The process of claim 6 wherein said unfolding is effected on two bending axes.

8. The process of claim 7 wherein said unfolding is effected over one of said axes as a minor bending axis and over another bending axis as a major axis.

9. The process of claim 8 wherein said unfolding is further effected along two bending points adjacent the connection of said support arm and said arms.

* * * * *

Disclaimer 5,516,130 - James Mitchell, Mequon, Wis. FORGED CONTROL ARM. Patent dated May 14, 1996. Disclaimer filed March 4, 1999, by the assignee, Interstate Forging Industries Inc.

Hereby enters this disclaimer to claims 1-3 of said patent.

*(Official Gazette,* May 18, 1999)